Dec. 29, 1964 A. E. TOMES 3,163,486
SYNCHRONIZED RECORDING DEVICE
Filed May 10, 1963 3 Sheets-Sheet 1
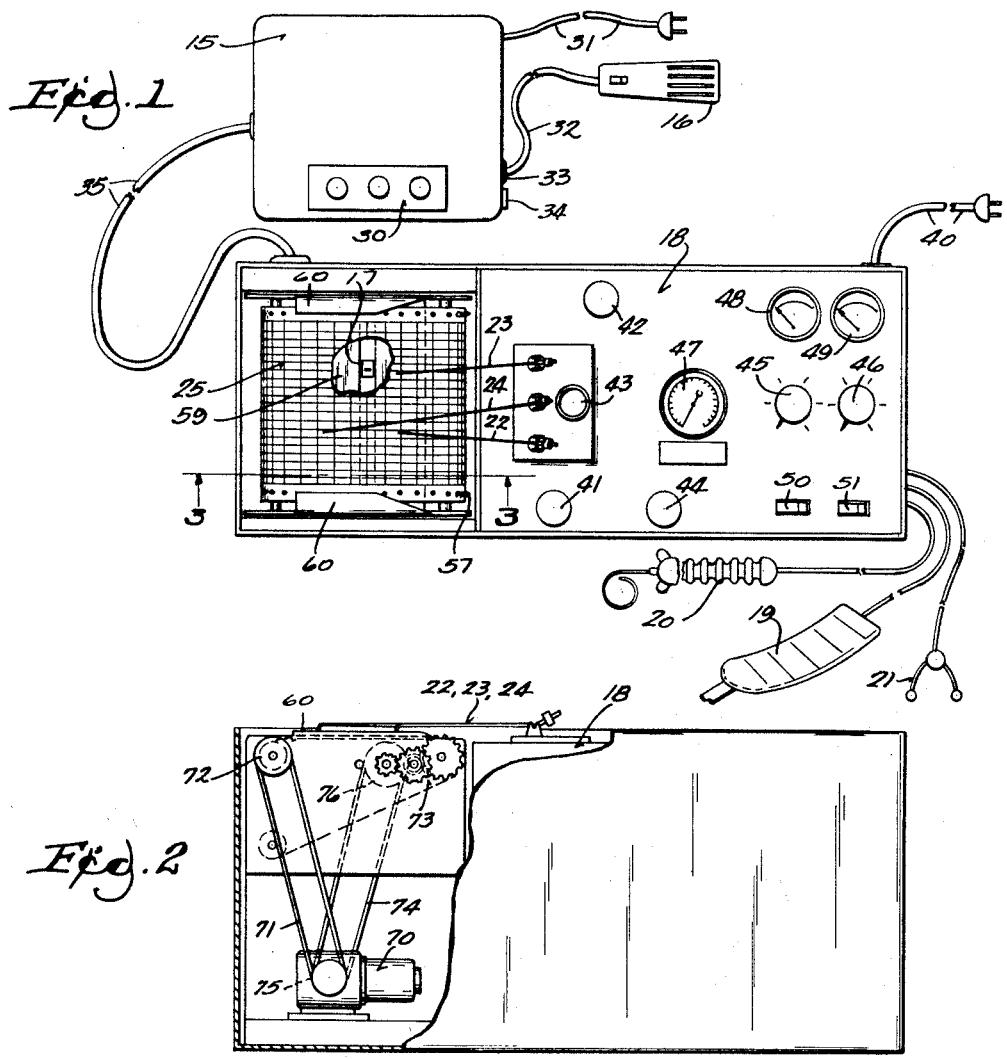
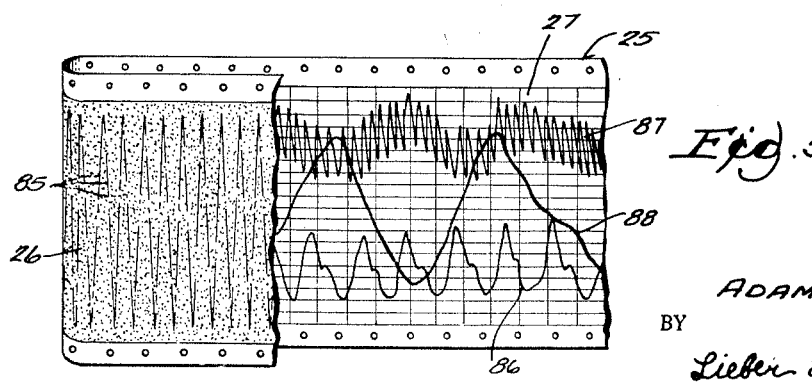
INVENTOR.
ADAM E. TOMES
BY
Lieber & Nilles
ATTORNEYS

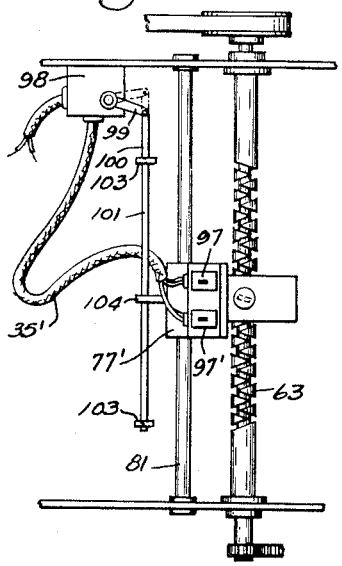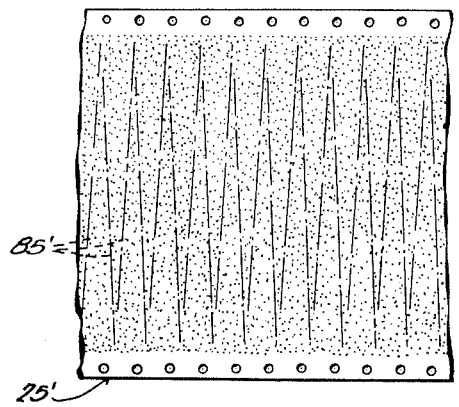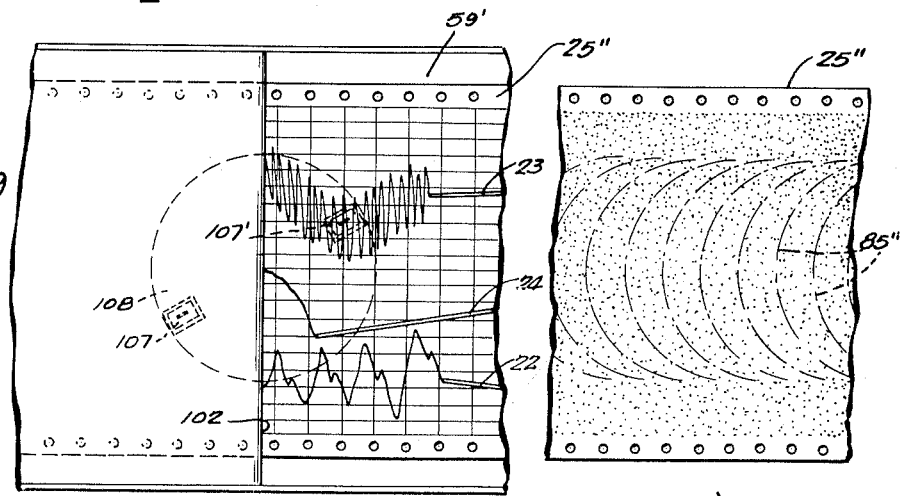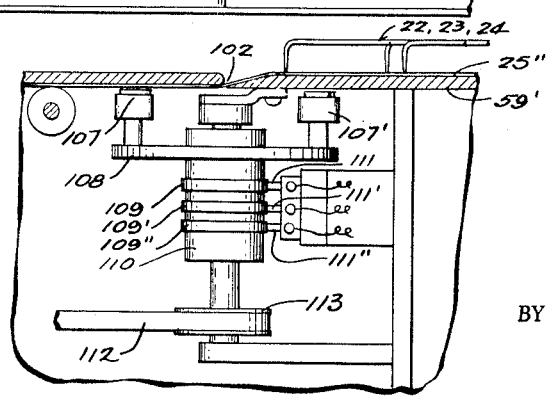
INVENTOR.
ADAM E. TOMES
BY
Lieber & Nilles
ATTORNEYS

United States Patent Office 3,163,486
Patented Dec. 29, 1964

3,163,486
SYNCHRONIZED RECORDING DEVICE
Adam E. Tomes, Milwaukee, Wis., assignor to St. Luke's
Hospital Research Foundation, Inc., Milwaukee, Wis.,
a corporation of Wisconsin
Filed May 10, 1963, Ser. No. 279,499
13 Claims. (Cl. 346—33)

The present invention relates generally to improvements in the art of lie detection, and relates more particularly to the provision of an improved device for synchronizing sound with various physiological responses.

A primary object of the invention is to provide an improved mechanism by means of which verbal and physiological responses may be recorded on a single tamper-proof tape in a simple, economical and highly efficient manner while permitting use of available sound and polygraph recording equipment.

Numerous magnetic voice recording and transcribing machines are commercially available which store magnetic impressions or electric signal currents on a magnetic storage medium such as a magnetic tape, and which reproduce such magnetic impressions in the form of electric signal currents respectively. These magnetic recorders are used for many purposes including the recording of testimony as in the legal profession and in the field of criminology wherein it is desirous to record a series of questions and answers. Such machines are presently merchandised under various trade names.

Machines are also commercially available which chart a variety of physiological responses of an individual being interrogated, such as respiration, heart rate, blood pressure, muscle tension and galvanic skin resistance. These recorders are known as Polygraph machines or Lie Detectors and are also used in criminology and other fields to chart and record a subject's physiological responses to a series of questions and answers.

At present, the polygraph machine is used to record the various physiological responses of a patient on a paper chart which is fed continuously past a number of pens which record such conditions as the patient's heart action, respiratory pattern, changes in skin-resistivity, blood pressure and the like on the advancing chart. At the same time, the audio record constituting questions asked of the patient and his verbal responses are recorded separately on the tape of a voice recorder, and to tie in the questions and answers recorded on the tape with the physiological responses recorded on the polygraph chart, it is common practice to use numbers or identifying symbols which are entered on the chart by the operator or someone under the operator's direction. Since such a record can obviously be altered in various ways to bring about a desired result, there is no definite proof of complete synchronization between the subject's voice and other recorded responses, and polygraph records have therefore not received complete acceptance as legal evidence.

It is therefore an object of the present invention to provide an improved synchronized recording device which obviates the above mentioned objections and disadvantages.

Another object of this invention is to provide an improved device wihch definitely co-ordinates and synchronizes sound with other recorded responses to thereby remove all doubt as to the accurate connection between questions and answers and the other various responses.

Still another object of the invention is to provide an improved device which may be readily attached to available polygraph machines and which enables such machines to be operated in direct conjunction and synchronization with a magnetic tape recorder for the production of a visual and audio record on a single tape and chart which is impossible to alter by tampering and which should therefore be completely acceptable as legal evidence.

A further object of my present invention is to provide an improved mechanism by means of which both sound and physiological responses are recorded on the same paper by means of an available voice recorder and polygraph machine coupled together in such a manner that the tape recorder and the kymograph drive of the polygraph machine are tied or keyed to the same power source to thereby make alteration impossible.

An additional object of the present invention is to provide improved instrumentalities for recording sound on one side of a continuous tape treated with magnetic oxide while simultaneously recording a visual chart on the other side of the tape thus reflecting various physiological responses directly keyed to the audio portion, the record being capable of indefinite storage and playback of the entire interrogation with simultaneous projection of the responses for visual observation.

These and other additional objects and advantages of the present invention will become apparent from the following detailed description.

A clear conception of the features constituting the present invention and of the mode of constructing, assembling and operating a typical voice recording and polygraph system embodying my improvements may be had by referring to the drawings accompanying and forming a part of this specification wherein like reference characters designate the same or similar parts in the several views.

FIG. 1 is a plan view of a typical magnetic sound recorder and a typical polygraph machine coupled together in accordance with the invention so that the voice and physiological responses will be recorded on a common tape, a portion of the tape being broken away to reveal the recording head of the sound recorder;

FIG. 2 is a side elevational view of the polygraph machine with a portion of the casing broken away to show the drive mechanism for the recording tape;

FIG. 5 is a fragmentary view of a tape with recorded audio or verbal questions and responses schematically illustrated on one side thereof and with the corresponding physiological responses on the other side;

FIG. 6 is a more-or-less diagrammatic fragmentary view similar to FIG. 4 but illustrating a somewhat modified voice recorder having a double recording head and switches for controlling operation thereof;

FIG. 7 is a fragmentary view of a tape with audio recordings from the double head recorder of FIG. 6 schematically illustrated thereon;

FIG. 8 is a fragmentary section similar to FIG. 3 but showing a further modified sound recording head of the rotary type operating on the tape simultaneously with the polygraph pens;

FIG. 9 is a fragmentary top view of the modified device of FIG. 8; and

FIG. 10 is a fragmentary view of a tape with the recorded sound tracks of the modified recording head of FIGS. 8 and 9 schematically illustrated on the audio side of the tape.

Figure 4:
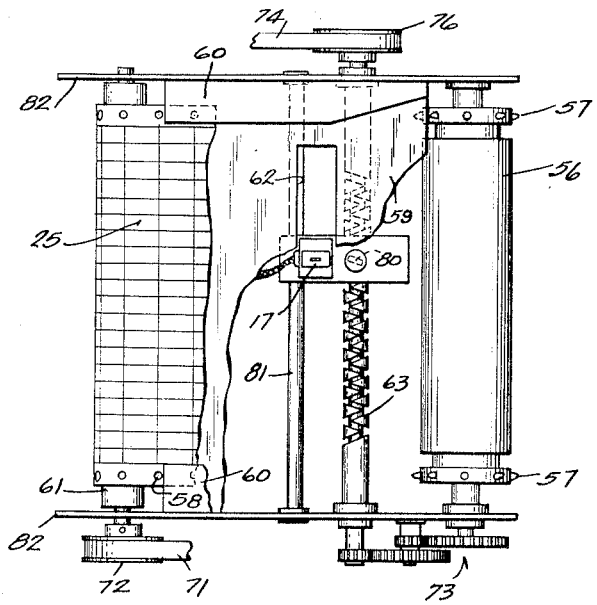
FIG. 4 is a similarly enlarged fragmentary top view of the recording zone with portions of the tape and the tape guide being broken away to reveal normally concealed structure.

While the improvements have been illustrated and described herein as being embodied in a particular type or types of magnetic recorder and polygraph machine used for specific purposes to simultaneously record a line of interrogation and certain phsiological responses, it is not intended or desired to thereby unnecessarily restrict the invention since it can be utilized to advantage with recorders of various types of numerous purposes to record a wide variety of responses. It is also contemplated that certain descriptive terminology used herein shall be given the broadest possible interpretation consistent with the disclosure.

Referring to the drawings, the synchronized recording device shown therein as embodying the invention comprises, in general, an electronic sound recorder 15, having a microphone 16 connected therewith for receiving audible sounds and a magnetic recording head 17 also connected thereto for recording the sounds as fed to the microphone, an electronic polygraph instrument 18 equipped with a variety of attachment devices 19, 20, 21 for receiving physiological responses and with a plurality of recording pens 22, 23, 24 for recording such physiological responses, a tape 25 having one side 26 coated with a magnetic material and the other side 27 devoid of such magnetic material, and means for feeding the tape 25 between the magnetic recording head 17 and the recording pens 22, 23, 24 with the coated side 26 in contact with the head 17 and the other side 27 in simultaneous contact with the pens 22, 23, 24 whereby the audible sounds and the physiological responses are both recorded on the same tape in synchronized and chronological order.

The recorder 15 may be of any suitable commercially available type housing the usual electroic components, amplifiers and electrical circuity, and the recorder is also provided with a convenient control panel 30 and the customary plug-in electric supply cord 31 connectable to a source of electrical power. The microphone 16' is connected to the recorder 15 by an electrical cord 32, and is preferably of the plug-in type whereby it may be selectively connected to the input jack 33 or the output jack 34, or a separate speaker may be provided if desired. While it is customary practice to build the magnetic recording head directly into the recorder, the recording head 17 in the present device is located remote from the recorder 15 as shown, and is connected therewith by a conductor cord 35 whereby the electric signal currents are conducted to and from the head 17. The polygraph 18 is a physiological response recording instrument likewise commercially available on the open market and houses the necessary components and circuitry for receiving and transmitting a number of physiological changes resulting from the interrogation of an individual. The polygraph machine 18 illustrated in the present instance includes, for example, a cardio-sphygmograph unit having the cuff and hose assembly 19 associated therewith for recording the amplitude and frequency of the patient's heart action through the pen 22; a pneumograph unit with the chest and hose assembly 20 coupled thereto for recording the amplitude and pattern of respiration of the patient by means of the pen 23; and a galvanograph unit having the hand electrode assembly 21 connected thereto for recording changes in the skin-resistivity of the patient by means of the galvanograph pen 24. The polygraph instrument is likewise connectable to a source of electrical supply by means of a plug-in connector cord 40, and has a control panel which includes control knobs 41, 42, 43 for the pens, a resonance control knob 44, a number of potentiometer knobs 45, 46, a sphygmometer 47, a reference voltmeter 48, a milliameter 49, and switches 50, 51.

In accordance with this invention, the tape 25 having one of its sides 26 coated with a magnetic material, such as a magnetic oxide which is commercially available for such purposes, is fed between the audio recording head 17 and the pens 22, 23, 24 of the polygraph instrument with the coated side in contact with the head 17 and the uncoated side in contact with the pens. The mechanism for thus feeding the tape may conveniently consist of a supply roll 55 from which the tape 25 is drawn by a driven roll 56 having sprocket teeth 57 carried at the opposite ends thereof meshing with perforations 58 along the edges of the tape to positively drive the same and insure against slippage. From the sprocket roll 56, the tape 25 is advanced over a guide plate 59 having edge guides 60 and is wound on a driven pick-up reel 61, the coated side 26 of the tape facing downwardly with the uncoated side 27 thereof exposed upwardly as the tape is advanced through the guide. As shown, the upwardly exposed side 27 of the tape 25 may conveniently be printed with graph lines providing a chart and the points of the pens 22, 23, 24 bear against the tape as supported on and fed over the guide plate 59. The guide plate 59 is also provided with a transverse opening or elongated window 62, and the audio recording head 17 is positioned within this opening 62 in contact with the magnetically coated side 26 of the tape, the head 17 being mounted on a reversing worm gear 63 or the like for reciprocating the same within the window opening 62 back and forth across the tape 25 as it is advanced over the guide plate 59.

The pick-up reel 61 may be driven directly from a small electric motor 70 or the like by means of a belt 71 and sheave 72. However, the sprocket roll 56 is driven through positive reduction gearing 73 from the reversing traverse gear 63 which is, in turn, driven at a relatively high rate of speed by the motor 70 through a drive belt on chain 74 and sheaves or sprockets 75, 76. Since the recording head 17 as driven by the reversing gear 63 is traversing and recording transversely across the tape as the pens 22, 23, 24 are recording longitudinally thereof, the speed of the reversing gear 63 must be considerably greater than that of the roll 56 and they must furthermore be keyed to each other. The recording head 17 is suitably carried on a block 77 having a transverse bore 78 slidably receiving the traverse gear 63 and also provided with an aperture 79 extending perpendicularly to the bore 78 for receiving a swivelling pin 80 meshing with the thread of the gear 63. Also, the block 77 and the recording head 17 carried thereby are guided and stabilized in their movement by a guide rod or shaft 81 secured to the side walls 82 of the drive section and slidably received by another bore in the block 77 spaced laterally of and extending parallel to the bore 78.

It is thus apparent that as the apparatus is operated the tape 25 is drawn from the supply roll 55 by the sprocket roll 56 and is advanced across the guide plate 59 to the pick-up reel 61, audible sounds picked up by the recorder 15 via the microphone 16 are transmitted to the recording head 17 as electric signal currents and are, in turn, recorded by the head transversely across the coated magnetic side 26 of the tape 25 as depicted schematically by the phantom lines 85 in FIG. 5. Simultaneously, the physiological responses of the patient as measured by the various instruments 19, 20, 21 are translated by the polygraph 18 and are recorded by the respective pens 22, 23, 24 on the uncoated graph side 27 of the tape as depicted by the lines 86, 87, 88 in FIG. 5. The single tape 25 accordingly contains both the sound record and a record of the physiological responses completely synchronized and locked together in an entirely tamperproof manner for subsequent study or review.

Figure 3:
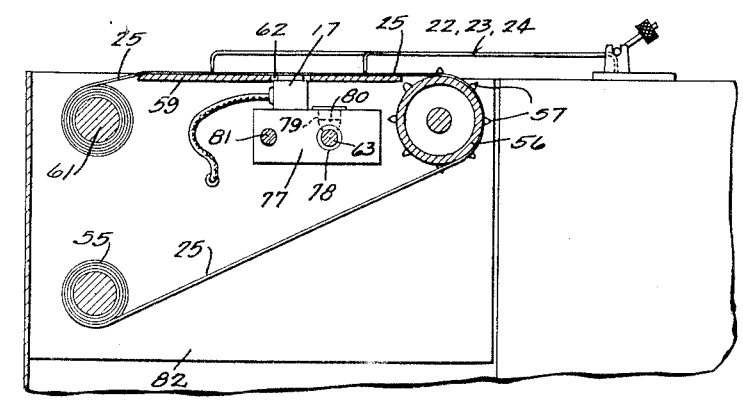
FIG. 3 is a somewhat enlarged fragmentary section through the recording zone of the apparatus taken along the line 3—3 of FIG. 1.

While the synchronized recording device thus described with reference to FIGS. 1 to 6 of the drawings has proven highly satisfactory in its performance, it can be seen from the phantom illustration of the sound lines 85 in FIG. 5 that there is a very slight momentary overlap at each end of the sound track in which the recording head 17 reverses, and this overlap, although very slight, causes a momentary distortion of the sound in the transcription thereof. To obviate this minor objection, a double recording head and switch mechanism therefore may be advantageously employed. As shown in FIG. 6, the modified sound recorder is provided with a pair of laterally spaced recording heads 97, 97' carried by the block 77' which is reciprocated by the driven reversing gear 63 in the same manner as above described. In this case, each of the heads 97, 97' is connected by conductors 35' with the recorder 15, and a suitable switch 98 is connected by link 99, 100 to an actuating rod 101 slidable in an actuating finger 104 carried by the block 77', the finger 104 coacting with stops 103 at the end of each stroke to alternately actuate the switch. Accordingly, as the block 77' and the recording heads 97, 97' approach the end of each run with one of the heads operatively connected with the recorder and just before the block and heads are about to reverse, the switch 98 is actuated to connect the other one of the heads with the recorder while disconnecting the first head. The resultant sound track is indicated in phantom by the lines 85' on the tape 25' of FIG. 7, and it is apparent that the overlap and resultant sound distortion at each end has been entirely eliminated.

Another modification in the device which effectively eliminates any momentary distortion employs a rotatable double recording head as shown in FIGS. 8, 9 and 10. In this arrangement, the guide plate 59' is formed with a transverse slot 102 which replaces the window opening 62 and through which the tape 25" is threaded and advanced with the pens 22, 23, 24 in effective contact with the tape before it reaches the slot 102. The recording heads 107, 107' are, in turn, carried in diametrically opposed relation on a revolvable disk 108 having a series of annular conductors 109, 109', 109" carried by the hub portion 110 and connected through brushes 111, 111', 111" with the recorder 15. The disk 108 is centered immediately below the slot 102 in the guide plate 59' so that the heads 107, 107' alternately contact and traverse the magnetically coated side of the tape as the disk is rotated by the motor driven belt 112 and sheave 113 and as the tape advances below the plate 59'. With this modified arrangement, the resultant sound lines 85" are as shown in phantom on the tape 25" in FIG. 10, and the speed of the tape may be increased somewhat since it is not necessary to reverse the recorder heads as in the devices of FIGS. 1 to 7.

In each of the modifications, it is apparent that both the sound and the physiological responses are directly keyed to each other and are recorded in complete synchronism on a single tape. The tape may obviously be conveniently studied with the polygraph recordings being visible as the audio record is played through the recorder and/or speaker, and if desired, the chart of the visual recording may be projected upon a screen. The improved device accordingly provides an extremely effective instrumentality for assemblying and presenting evidence which insures against possible tampering as well as human error.

Various modes of carrying out the invention are contemplated as being within the scope of the following claims particularly pointing out and distinctly claiming the subject matter which is regarded as the invention.

I claim:

1. A synchronized recording device comprising, a sound recorder having a magnetic recording head connected thereto for recording audible sounds, a physiological response recording instrument equipped with at least one device for receiving physiological responses and with at least one pen for recording such responses, a tape having one side thereof coated with a magnetic material and the other side devoid of such material, and means for feeding said tape between the magnetic recording head of said sound recorder and the recording pens of said instrument with the coated side thereof in contact with said head and the other side thereof in simultaneous contact with said pens, whereby the audible sounds and the physiological responses are both recorded on said tape in synchronized and chronological order.

2. A synchronized recording device according to claim 1, wherein the magnetic recording head is located remote from the sound recorder and is mounted on a movable carrier member.

3. A synchronized recording device according to claim 2, wherein means are provided for reciprocating the carrier member and the magnetic recording head carried thereby transversely of the path of movement of the tape as it is fed longitudinally between the recording head and the recording pens, whereby the sounds are recorded on the tape transversely thereacross while the physiological responses are recorded longitudinally thereof.

4. A synchronized recording device according to claim 3, wherein the carrier member is provided with a pair of laterally spaced magnetic recording heads and switch mechanism is provided for alternately operably connecting the heads with the sound recorder as the carrier member approaches the ends of its successive strokes.

5. A synchronized recording device according to claim 2, wherein means are provided for revolving the carrier member to cause the magnetic recording head carried thereby to traverse the tape as it is fed longitudinally between the recording head and the recording pens, whereby the sounds are recorded on the tape transversely thereacross while the physiological responses are recorded longitudinally thereof.

6. A synchronized recording device according to claim 5, wherein the revolvable carrier member is provided with a pair of diametrically opposed magnetic recording heads alternately operable to record sounds on the tape as the carrier member is revolved.

7. A synchronized recording device according to claim 2, wherein means are provided for driving the carrier member and the magnetic recording head carried thereby in synchronism with the tape feeding means.

8. A synchronized recording device comprising a sound recorder having a remote magnetic recording head connected thereto for recording audible sounds, a physiological response recording instrument equipped with at least one attachment device for receiving physiological responses and with at least one pen for recording such responses, said recording head and said recording pens being located in proximity to and one above the other, a tape having one side thereof coated with a magnetic material and the other side devoid of such material, and means for feeding said tape between and for advancing the same past the magnetic recording head of said sound recorder and the recording pens of said instrument with the coated side thereof in contact with said head and the other side thereof in simultaneous contact with said pens, whereby both the audible sounds and the physiological responses are recorded on opposite sdes of said tape in synchronized and chronological order.

9. A synchronized recording device according to claim 8, wherein the magnetic recording head is mounted for reciprocable movement on a reversing worm gear, extending transversely of the path of advancement of the tape.

10. A synchronized recording device according to claim 9, wherein the reversing worm gear and the tape feeding and advancing means are coupled to one another by speed reduction gearing, whereby the worm gear is driven to reciprocate the head at a faster rate of speed than the speed at which the tape is advanced.

11. An adapter for coupling a magnetic sound recorder to a polygraph instrument which includes recording pens for simultaneously recording sounds and physiological responses in synchronism on a tape having one side thereof coated with a magnetic material and the other side devoid of such material, said adapter comprising, means for supporting the magnetic recording head of the sound recorder in proximity to the pens of the polygraph instrument, and means for feeding and advancing the tape between the magnetic recording head and the recording pens with the coated side thereof in contact with said head and with the other side thereof in simultaneous contact with said pens.

12. An adapter for coupling a magnetic sound recorder to a polygraph instrument which includes recording pens for simultaneously recording sounds and physiological responses in synchronism on a tape having one side thereof coated with a magnetic material and the other side devoid of such material, said adapter comprising, means for supporting the magnetic recording head of the sound recorder in proximity to the pens of the polygraph instrument, means for feeding and advancing the tape longitudinally between the magnetic recording head and the recording pens with the coated side thereof in contact with said head and with the other side thereof in simultaneous contact with said pens, and means for causing the head to traverse the tape transversely thereacross as the tape is advanced.

13. A synchronized recording device comprising, a sound recorder having a recording head connected thereto for recording audible sounds, a physiological response recording instrument equipped with at least one device for receiving physiological responses and with at least one pen for recording such responses, a tape having one side thereof adapted to receive audible recordings from said recording head and the other side adapted to receive physiological responses from said pen, and means for feeding said tape between said recording head and said recording pen with said one side thereof in contact with said head and the other side thereof in simultaneous contact with said pen, whereby the audible sounds and the physiological responses are both recorded on said tape in synchronized and chronological order.

References Cited in the file of this patent
UNITED STATES PATENTS

| | | |
|---|---|---|
| 1,234,852 | Avram | July 31, 1917 |
| 2,294,149 | Kline et al. | Aug. 25, 1942 |
| 2,632,815 | Crespinel | Mar. 24, 1953 |
| 2,712,975 | Golseth et al. | July 12, 1955 |
| 2,873,073 | Lekas | Feb. 10, 1959 |
| 2,943,908 | Hanna | July 5, 1960 |
| 2,946,645 | Schwarzer | July 26, 1960 |
| 2,999,907 | Hoskino | Sept. 12, 1961 |
| 3,031,647 | Dirks | Apr. 24, 1962 |
| 3,048,846 | Martin | Aug. 7, 1962 |
| 3,112,151 | Buros | Nov. 26, 1963 |